Jan. 26, 1926.                                            1,570,764
              H. J. MILLER
        AUTOMATIC SHOCKING MACHINE
        Filed June 25, 1923      13 Sheets-Sheet 2

Jan. 26, 1926. 1,570,764
H. J. MILLER
AUTOMATIC SHOCKING MACHINE
Filed June 25, 1923 13 Sheets-Sheet 4

Fig. 4

INVENTOR:-
Henry J. Miller
BY
Thorpe Gerard
ATTORNEYS.

Witness:
R. E. Hamilton

Jan. 26, 1926.

H. J. MILLER 1,570,764

AUTOMATIC SHOCKING MACHINE

Filed June 25, 1923     13 Sheets-Sheet 5

Jan. 26, 1926.

H. J. MILLER 1,570,764

AUTOMATIC SHOCKING MACHINE

Filed June 25, 1923  13 Sheets-Sheet 6

Witness:
R. E. Hamilton

INVENTOR:-
Henry J. Miller,
BY: Thorpe & Gerard
ATTORNEYS.

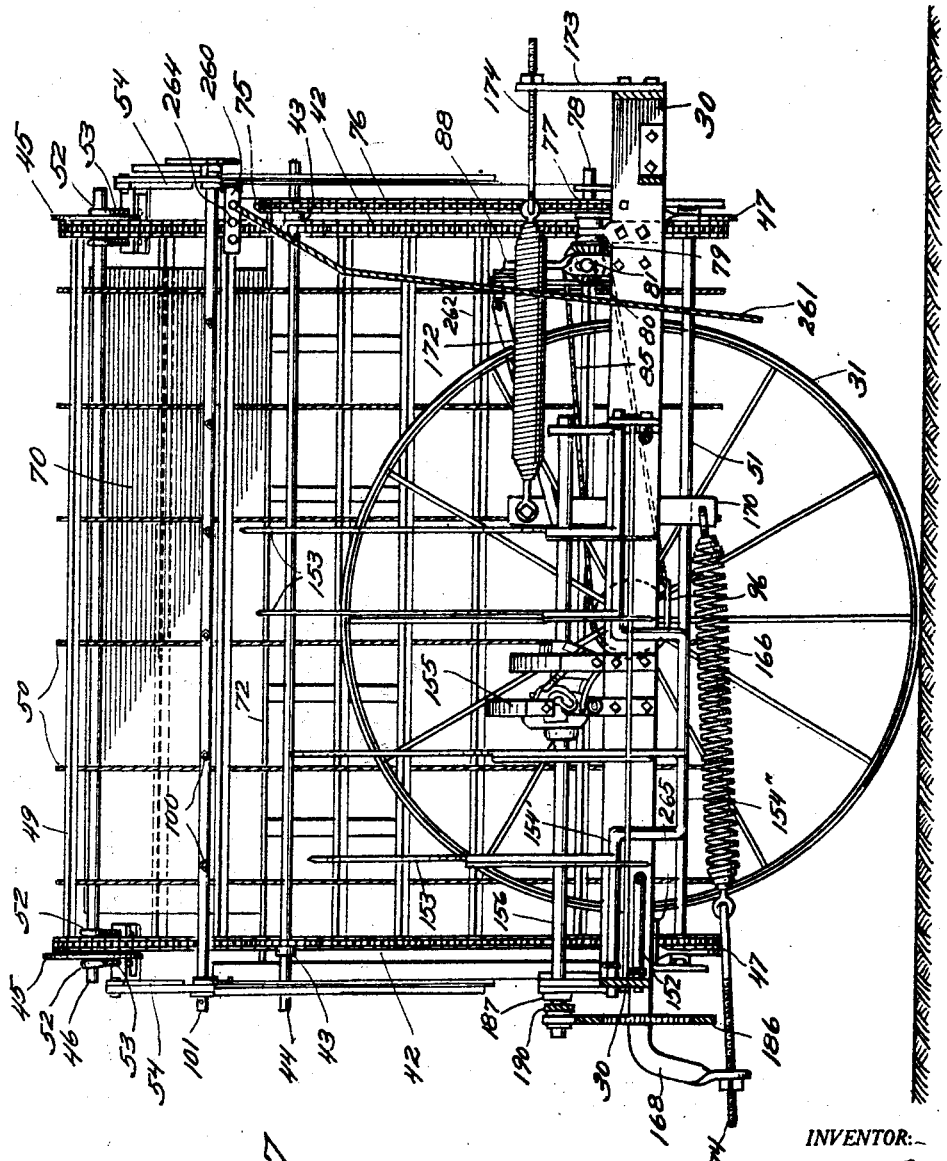

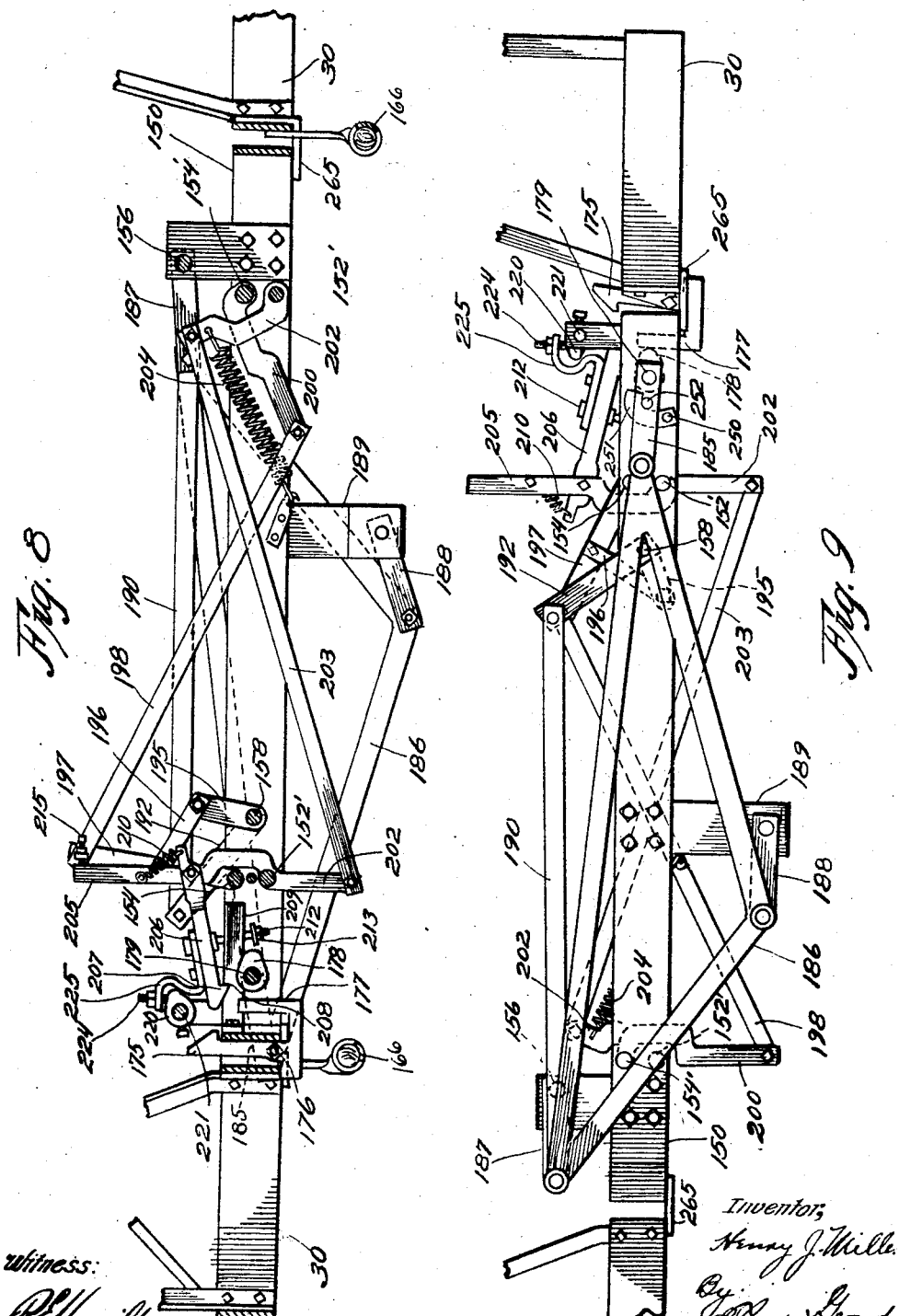

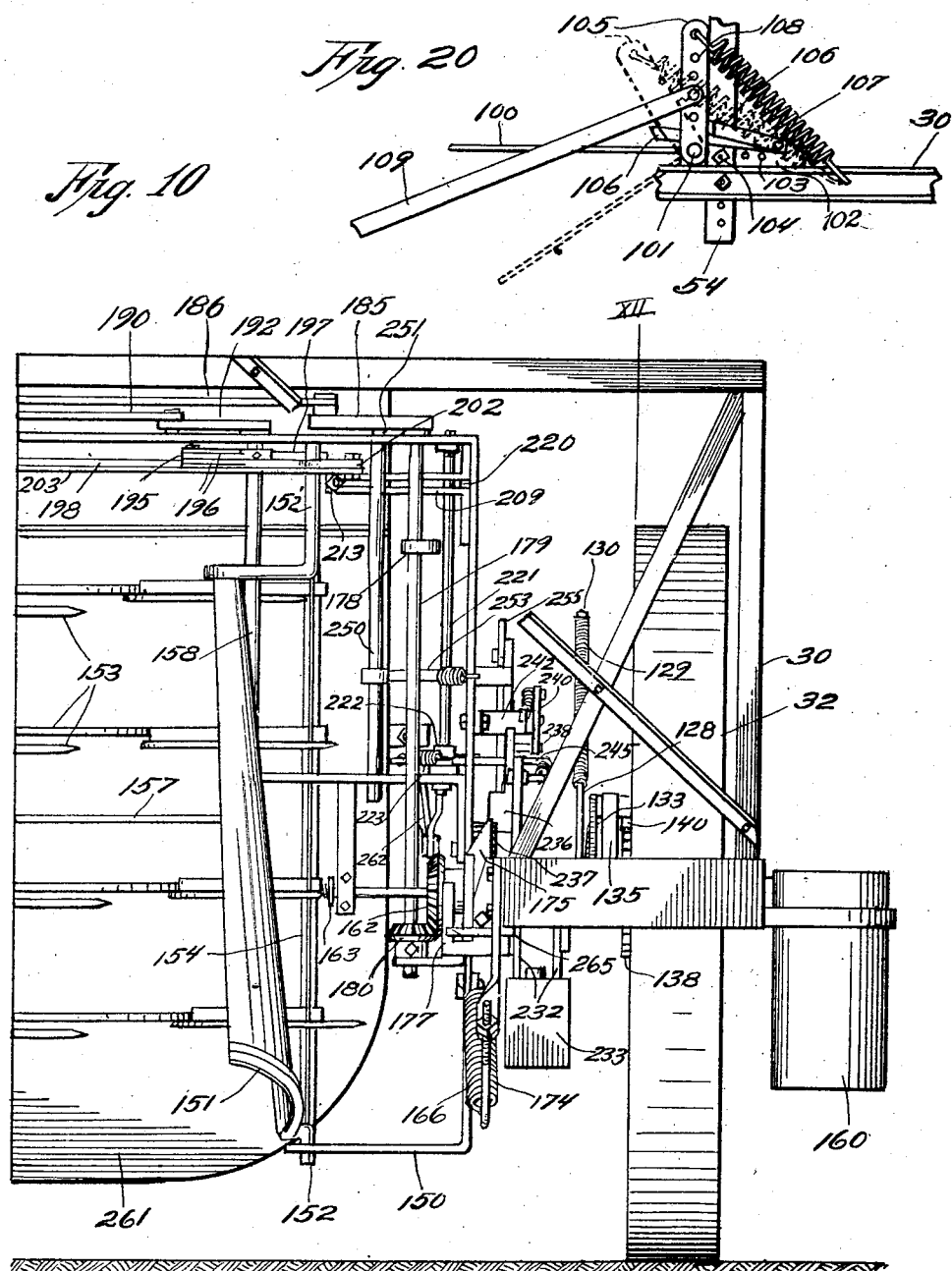

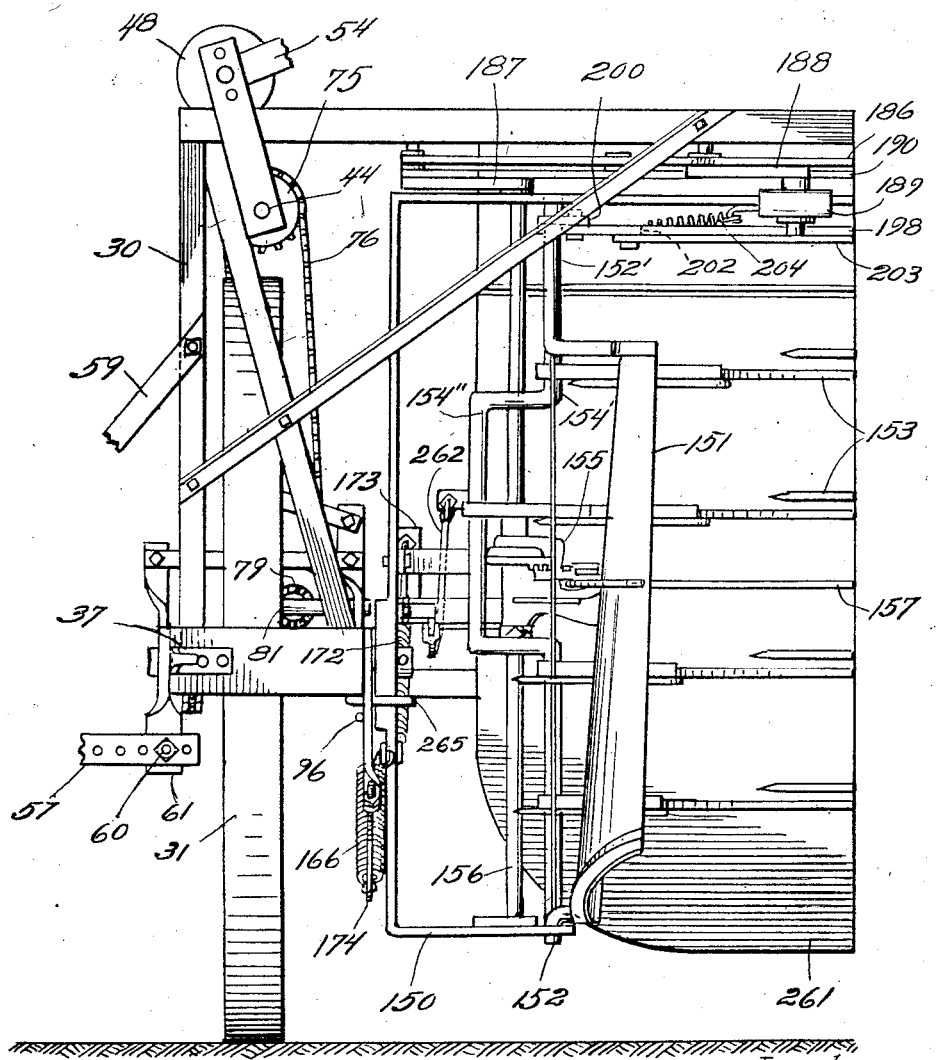

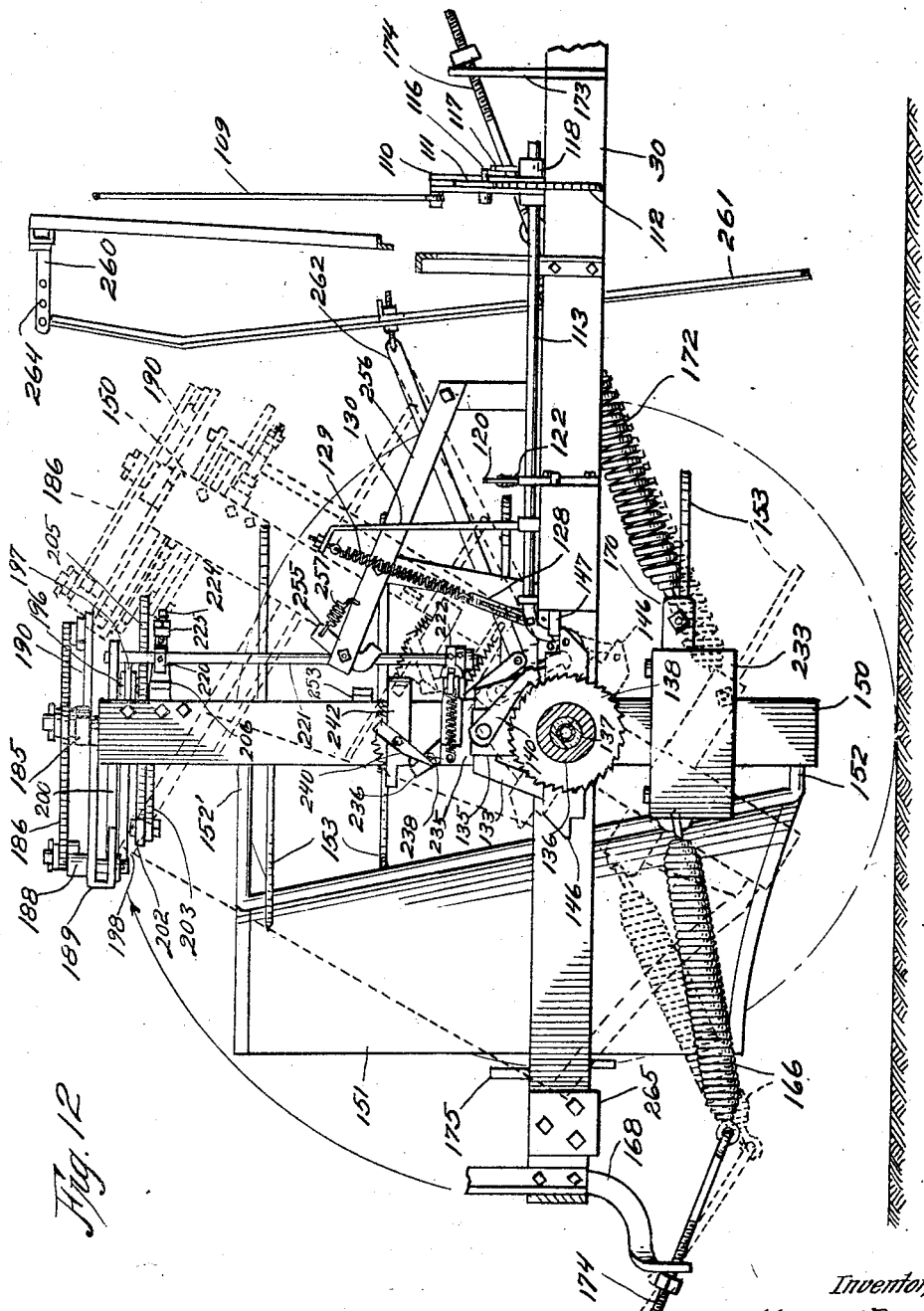

Jan. 26, 1926. 1,570,764
H. J. MILLER
AUTOMATIC SHOCKING MACHINE
Filed June 25, 1923    13 Sheets-Sheet 12
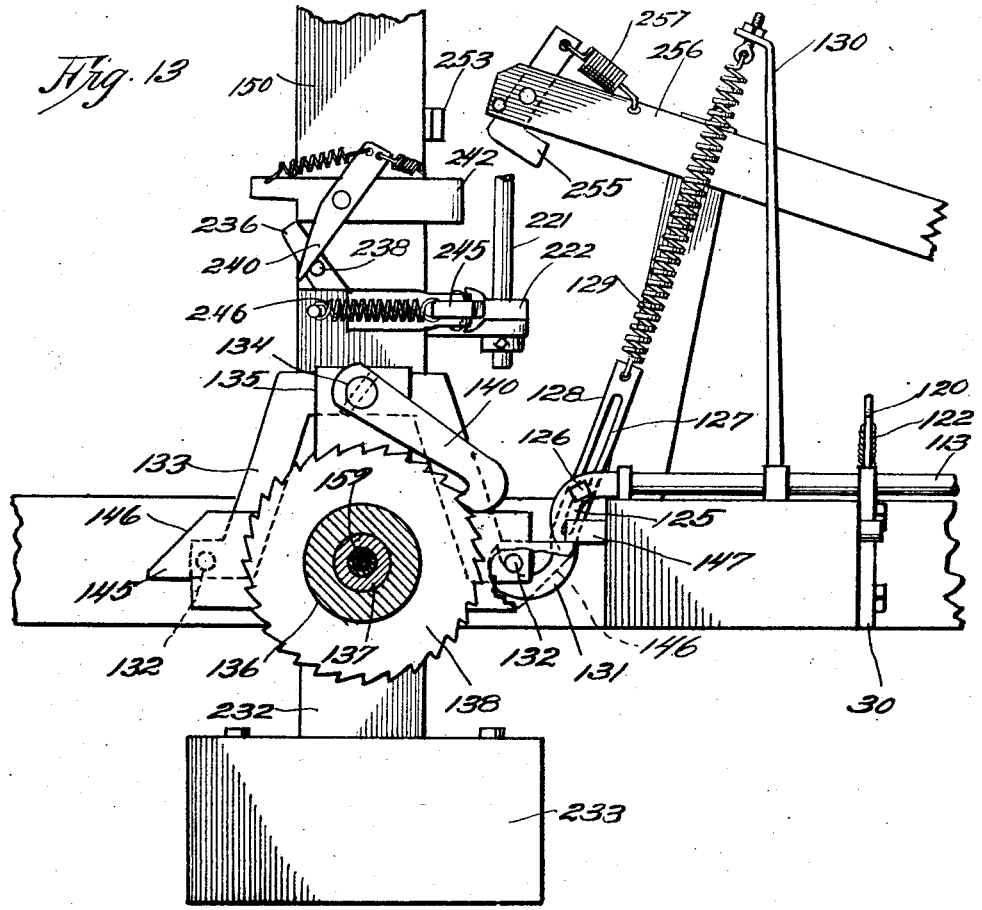
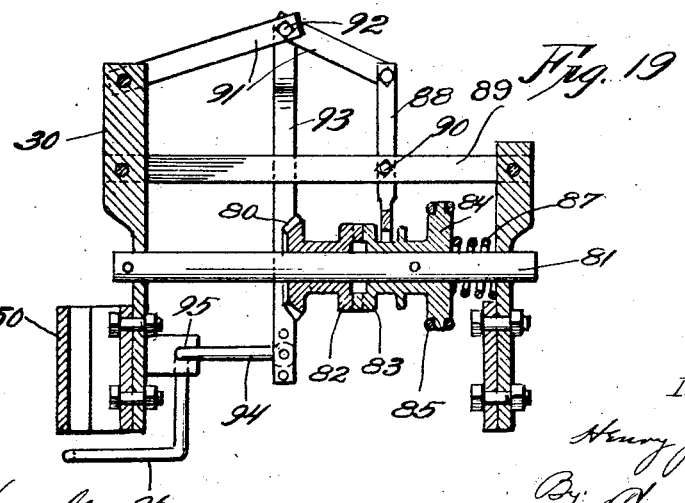
Inventor,
Henry J. Miller,
By Thorpe & Levant,
Attorneys.
Witness:
R. E. Hamilton

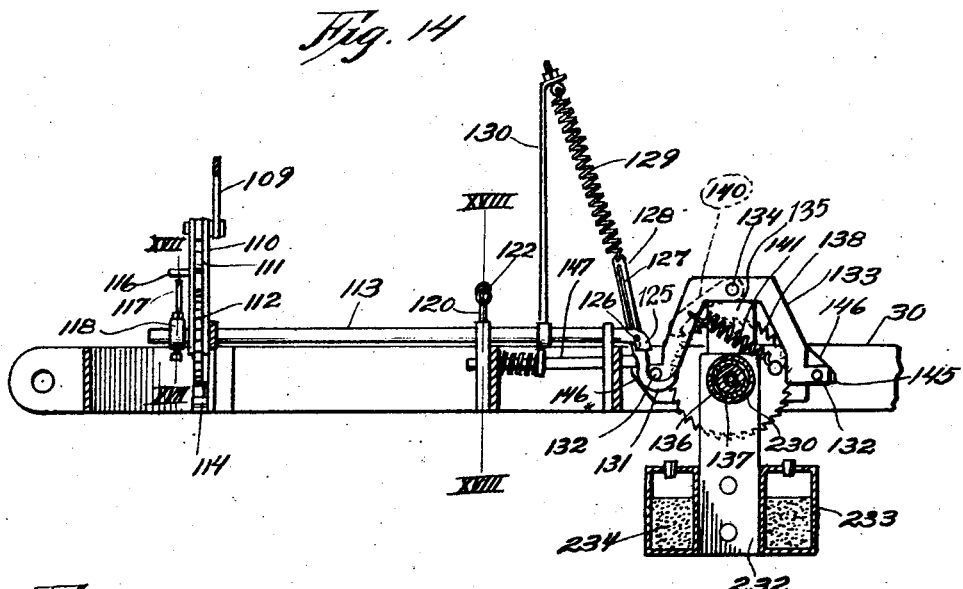
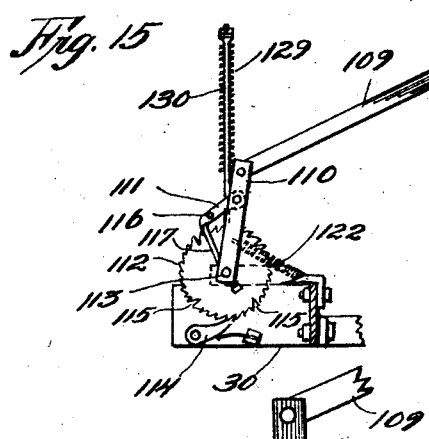
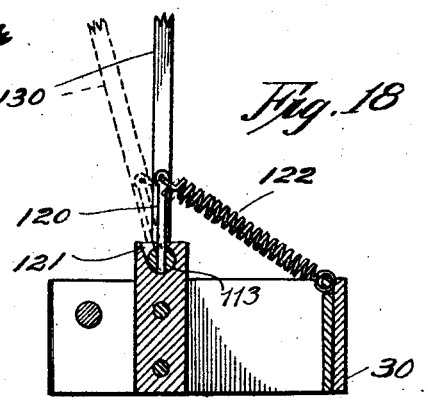
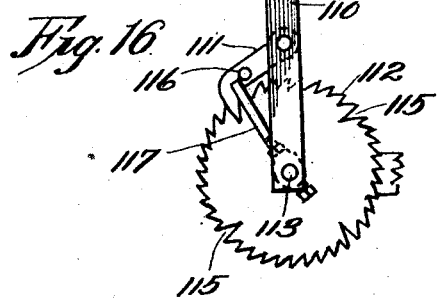

Patented Jan. 26, 1926.

1,570,764

UNITED STATES PATENT OFFICE.

HENRY J. MILLER, OF KANSAS CITY, MISSOURI.

AUTOMATIC SHOCKING MACHINE.

Application filed June 25, 1923. Serial No. 647,627.

*To all whom it may concern:*

Be it known that I, HENRY J. MILLER, a citizen of the United States, and resident of Kansas City, county of Jackson, State of Missouri, have invented a certain new and useful Improvement in Automatic Shocking Machines, of which the following is a complete specification.

The present invention relates to shocking machines for harvesting machinery, and aims to provide an automatic shocking apparatus adapted to be operated along with the grain cutting and binding machine for taking the bundles therefrom and setting the same up in shocked formation.

Accordingly, one of the objects of the invention is to provide an apparatus comprising a bundle receiving and elevating apparatus operating to receive the bundles from a binder and feed the same to the shocking mechanism, during which operation the bundles are also counted by a mechanism adapted to start the operation of the shocking mechanism periodically for each given number of bundles counted, according to the number of bundles required to form each shock.

The invention further comprises a shocking apparatus including a shock binding and tying mechanism operated from the same drive as the shock forming means and carried about the same axis in the up-ending of the shock.

In the form of the invention herein illustrated, the shocking apparatus comprises means adapted to receive the bundles in horizontal position and operated by the drive connections to up-end the bundles to set the shock in the proper upright position and automatically discharge the shock in this position; in which connection provision is made for automatically setting the shock in substantially true vertical position, regardless of the contour of the ground over which the apparatus is traveling.

It is also my object to devise a machine in which the main working parts involved in the shocking operation move about a common center, and in which the movement involved is of comparatively small amplitude and the bearing surfaces provided are of ample proportions.

With these general objects in view, the invention will now be described by reference to the accompanying drawings illustrating one form of construction of the apparatus which I have devised for embodying the proposed improvements, after which those features and combinations deemed to be novel and patentable will be particularly set forth and claimed.

In the drawings—

Figure 4 is a plan view showing that side of the machine appearing at the left in Figure 1, but on a larger scale and with portions of the upper part of the machine broken away;

Figure 7 is an enlarged section taken on the line VII—VII of Figure 1;

Figure 8 is an enlarged sectional detail view of certain operative connections at the rear of the machine;

Figure 9 is a rear view of the parts illustrated in Figure 8, but in different operative positions;

Figures 10 and 11 are rear elevations of the portions of the machine illustrated in Figures 4 and 5, respectively, but illustrating the basket-carrying frame and basket members turned into upright position for discharging the shock;

Figure 12 is a section on the line XII—XII of Figure 10, but on a slightly smaller scale, the dotted lines therein representing the maximum forward position of the basket-carrying frame;

Figure 13 is an enlarged sectional detail view on the same section line;

Figures 14 and 15 are sections taken on the lines XIV—XIV and XV—XV, respectively of Figure 4;

Figure 16 is an enlarged detail view of certain parts appearing in Figure 15;

Figures 17 and 18 are enlarged sectional detail views taken on the lines XVII—XVII and XVIII—XVIII, respectively, of Figure 14;

Figure 19 is a similar view taken on the line XIX—XIX of Figure 5; and

Figure 20 is an enlarged detail view of certain connections between the bundle conveyer and bundle-counting mechanism, hereinafter referred to.

Figure 1:
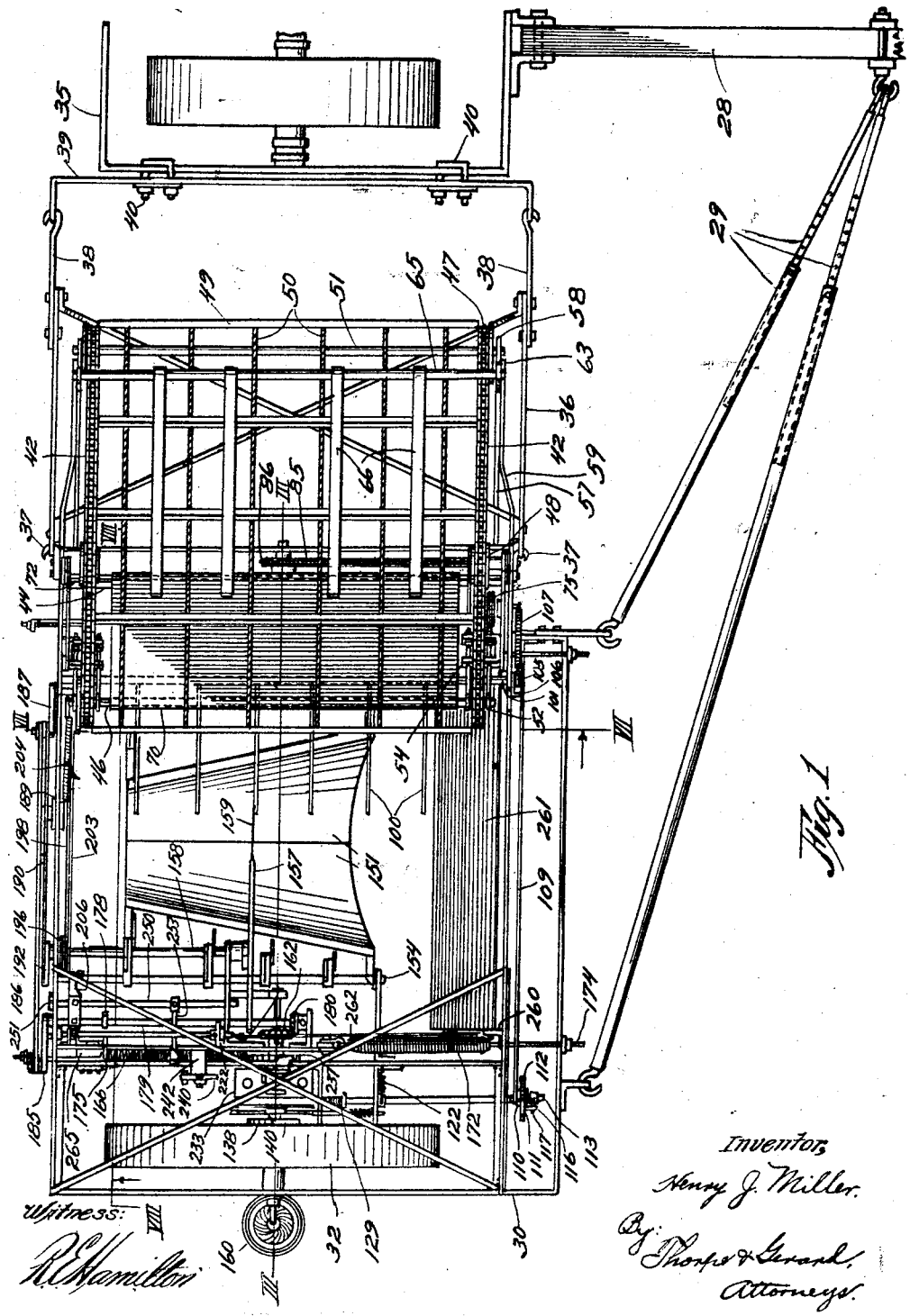
Figure 1 is a plan view of a machine embodying the present improvements.

Referring now to the drawings in detail, these illustrate the improved apparatus as embodied in a construction comprising a main frame 30 provided at its opposite sides with supporting wheels 31 and 32; that side of the frame which is supported by the wheel 31 is adapted to be connected with the frame 35 of a binder by means of a tie-frame 36 hingedly connected (as indicated at 37) to the frame 30, and also to the binder frame through the medium of hook members 38 adjustably secured to the frame 36 and hingedly engaging the ends of a bar 39 secured by U-bolts 40 to the binder frame. The front of the frame 30 is connected to the pole 28 of the binder by means of extensible draft members 29 (see Figure 1).

Figure 2:
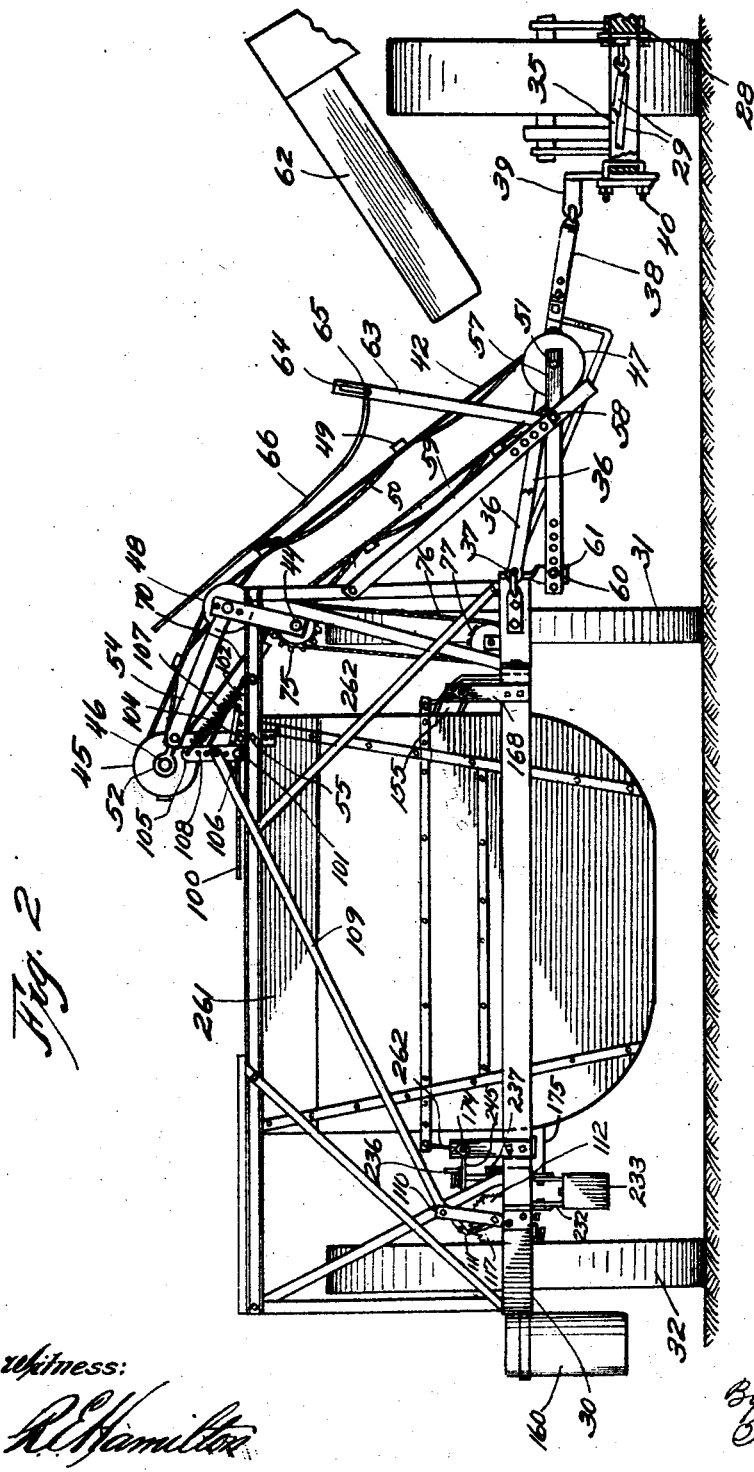
Figure 2 is a front elevation of the same.

The conveyer or elevator which receives the bundles from the binder comprises a pair of endless chains 42 operating around drive sprockets 43 on the opposite ends of a shaft 44, and also around idler wheels 45 journaled on a fixed shaft 46 at the upper end of the elevator, and around idler wheels 47 journaled on a fixed shaft 51 at the lower end of the elevator; intermediate the ends of the elevator, the chains 42 are carried around idler wheels 48 at the upper outer corner of the main frame 30, above the wheel 31. The chains 42 are connected at intervals by cross bars 49 supporting parallel strands of cord or rope 50 leaving enough slack between the bars 49 for accommodating the bundles of grain. The upper shaft 46 is mounted in bearings 52 supported by screws 53 adjustably carried by frame members 54, said frame members being in turn adjustable about the axes of the idler wheels 48 to raise and lower the upper end of the elevator, and adapted to be secured in any of its adjusted positions by bolts 55 provided for fastening said frame members 54 to the main frame 30. The lower shaft 51 is carried by the outer ends of frame pieces 57 (see Figure 2), which are adjustably secured by bolts 58 to the lower end portions of inclined frame members 59, the upper ends of which are secured to the main frame 30. The inner ends of the frame pieces 57 are adjustably attached to said main frame 30 by bolts 60 and hanger pieces 61. This frame structure enables the lower end of the elevator to be raised and lowered to conform to the elevation required by the discharge chute 62 of different types of binders. The frame pieces 57 also carry upright frame members 63, the upper ends of which are slotted, as indicated at 64, for slidingly receiving a rod 65, to which is attached a series of bundle-retaining fingers 66 for yielding engagement with the bundles as the latter travel upward on the elevator or conveyer. A pan 70 is supported within the upper end portion of the elevator to keep the upper and lower runs of the conveyer spread at the delivery end of the same, the upper margin of said pan being hooked over the shaft 46 (see Figure 7), and its lower margin resting on a fixed rod 72 carried by the main frame adjacent and parallel to the shaft 44.

Figure 5:
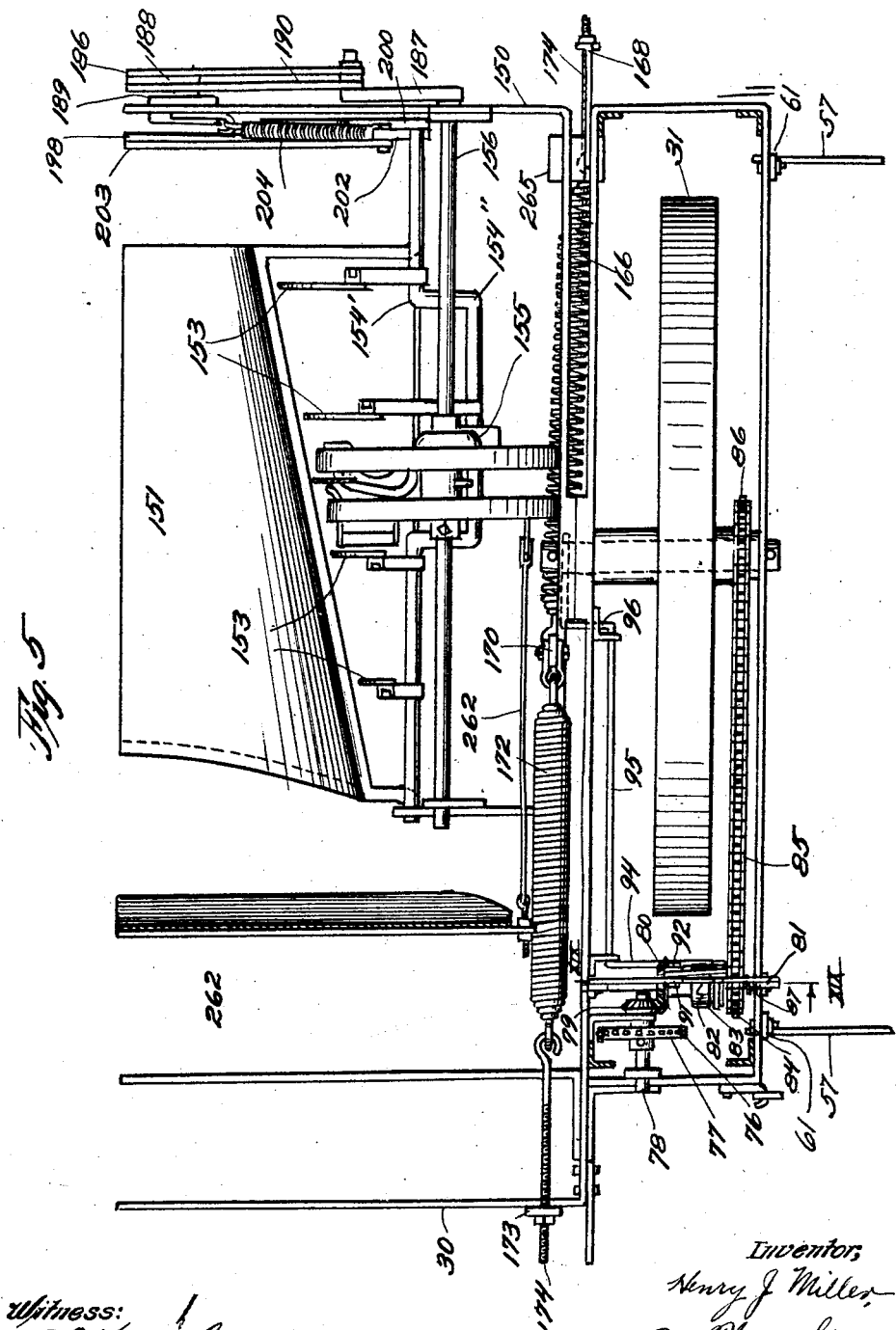
Figure 5 is a similar view showing that side of the machine appearing at the right in Figure 1, but omitting the bundle-feeding mechanism.

One end of the shaft 44 also carries a sprocket wheel 75 engaged by a chain 76 driven from a sprocket wheel 77 on a short shaft 78 carried by the main framework. One end of the shaft 78 is provided with a bevel pinion 79 engaging a bevel gear 80 keyed to a jack shaft 81. The gear 80 is formed with a clutch portion 82 (see Figure 5) adapted to be engaged by the clutch portion 83 of a sliding sprocket wheel 84 loosely mounted on the shaft 81 and driven by a chain 85 from a sprocket wheel 86 rigid with the hub of the supporting wheel 31. Referring to Figure 19, the clutch element 83 is maintained normally in engagement with the clutch element 82 by the action of the spring 87, but is adapted to be disengaged from said clutch element 82 by means of a lever 88 fulcrumed at 90 on a cross bar 89 rigid with the frame 30. This lever 88 is pivotally connected with one of a pair of toggle links 91, the toggle joint 92 of which is connected by a link 93 with a crank arm 94 on one end of a rocker shaft 95, the other end of which is provided with an angular arm 96 for engagement and operation by the movable frame of the shocking mechanism, as hereinafter described.

As the bundles are discharged at the delivery end of the elevator or conveyer above described, they are intercepted by a set of fingers 100 projecting laterally from a rock shaft 101 journaled in bearings formed in the ends of plates 102, each provided with a plurality of openings 103 (see Figure 20), whereby said plates may be adjustably secured by bolts 104 to the upright frame members 54, thus permitting a slight adjustment of the shaft 101, if necessary, to properly position the fingers 100 relative to the paths of the bundles from the conveyer to the shocking mechanism. The forward end of the shaft 101 carries a crank arm 105 operating between stops 106 and held normally retracted into engagement with one of said stops by the action of a coil spring 107. The crank 105 is provided with a plurality of openings 108 for adjustable connection with one end of a link 109, the other end of which is connected with an arm 110 carrying a pawl or ratchet 111 adapted for engagement with the teeth of a ratchet wheel 112 carried by a rock shaft 113 mounted in suitable bearings at that side of the main frame 30 which is supported by the main wheel 32 (see Figures 15 and 16). The arm 110 and wheel 112 are mounted for free movement on the shaft 113, said wheel being advanced step by step by the operation of the link 109 as actuated by the fingers 100, the spring-actuated catch 114 preventing any movement of the wheel 112 in the outward direction. At given intervals on the wheel 112 are provided notches 115, the number of teeth between said notches corresponding to the number of operations of the shaft 101 and its connections required to take place prior to each operation of the shocking mechanism, and hence the number of bundles to be tied in each shock. Each time the ratchet 111 drops into one of the notches 115, the movement of the ratchet by the link 109 causes a pin 116 carried by the ratchet to engage a pin 117 adjustably mounted in a block 118 fixed to the shaft 113 (see Figure 17), thereby imparting the required operative rocking movement to said shaft. The adjustment provided for the pin 117 simply facilitates the proper positioning thereof, and accommodates for any wear produced by the action of the pin 116. The rocking motion of the shaft 113 is limited by engagement of a pin 120 with opposite sides of a slot 121 in a frame piece providing one of the bearings for the shaft (see Figure 18), said pin being connected to a spring 122 serving to rock the shaft back into initial position on disengagement of the pins 116 and 117.

The rear end of the shaft 113 is formed with a downturned fork 125 carrying a transverse pin 126 engaging a slot 127 formed in a latch member 128, the upper end of which is connected by a coil spring 129 suspended from the upper end of an arm 130 carried by the shaft 113, said spring serving to maintain said latch 128 with the lower end of its slot 127 in engagement with the pin 126, as shown in Figure 14. The hook portion 131 at the lower end of the latch member 128 is designed for alternate engagement with a pair of pins 132, one carried by each of the arms 133 of a pawl-operating yoke which is pivoted as indicated at 134, to a block 135 secured to the outer end of a tubular or sleeve shaft 136 (see Figure 3). This sleeve shaft 136 rotates freely upon an interior tubular supporting shaft 137 on which the supporting wheel 32 is also mounted for free rotative movement, the hub of said wheel being formed with a ratchet wheel 138 adapted for engagement by a pawl or ratchet dog 140 connected with the pivot 134 of the yoke 133. A spring 141 is connected to one of the arms of the yoke 133 in such a way as to tend to throw the dog 140 normally into engagement with the teeth of the wheel 138, whereby movement of the wheel 32 will of course rotate the shaft 136 until the dog is disengaged from the wheel 138 by the action of the latch 128, as hereinafter explained. The block 135 is also formed with a pair of oppositely projecting latch arms 145 terminating in beveled catch portions 146 adapted for alternate engagement with a sliding spring-actuated latch member 147, as represented in Figure 13.

Figure 6:
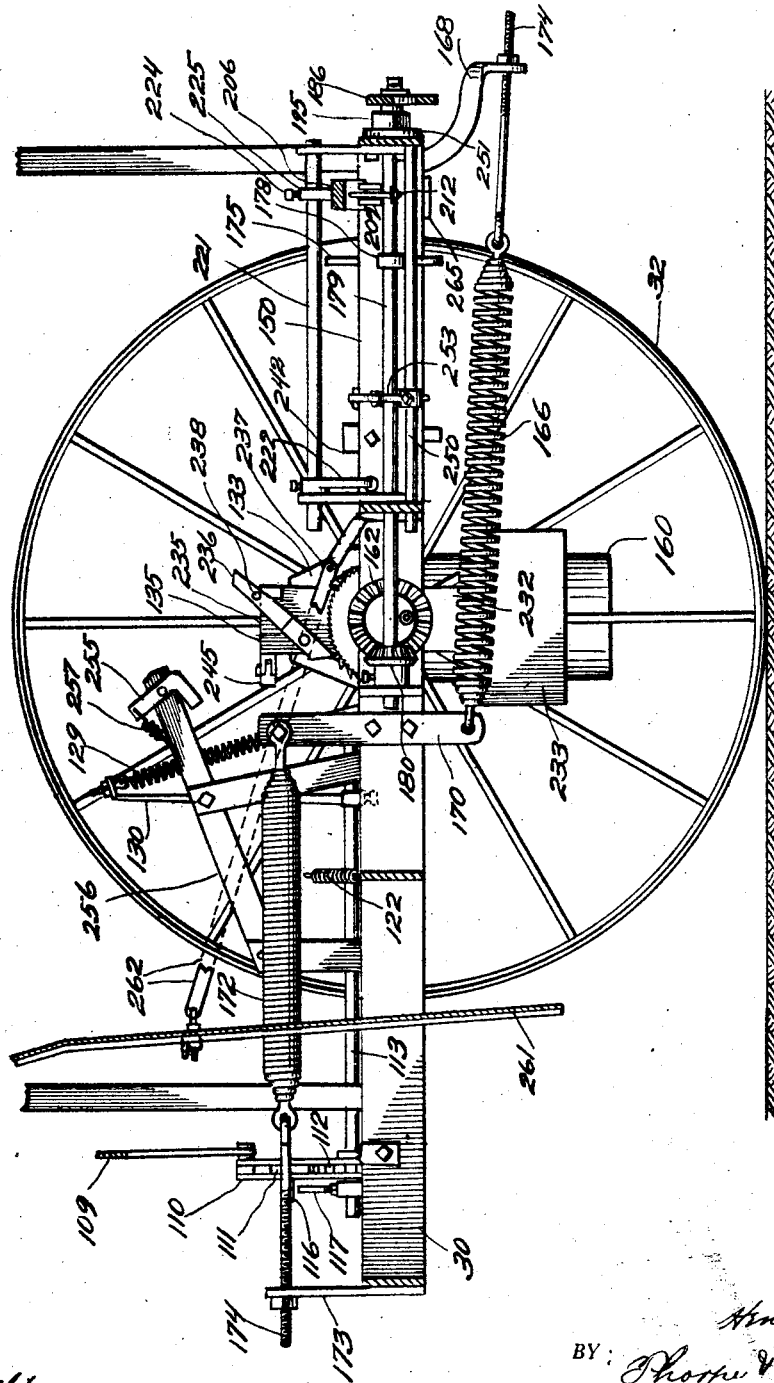
Figure 6 is an enlarged section taken on the line VI—VI of Figure 4.

Pivoted within the main frame 30 and about the common axis of the wheels 31 and 32 is a movable frame 150 forming a part of the shocking mechanism and designed for carrying a pair of mating basket members 151 supported by front and rear pivot arms 152, 152', two sets of curved bundle compressing arms 153 projecting from shafts 154 and 154', respectively, a knotting mechanism designated generally by the reference numeral 155 and driven by a shaft 156, and also a needle member 157 operated by a shaft 158 for feeding twine 159 to said knotting mechanism 155. A supply of the twine is maintained in a receptacle 160 adjacent the outside of the wheel 32, and the twine is conducted through the hollow shaft 137 and the center of a bevel gear 162 on the inner end of the sleeve shaft 136, and thence through a yielding twine-gripping device 163 to the usual tubular passage 164 carried by the needle 157. The shaft 154' is offset intermediate its ends as indicated at 154'', merely for the purpose of clearing the knotting device 155. A pair of strong coil springs 166 are provided for initiating the swinging movement of the frame 150, said springs being attached to fixed brackets 168 at the rear side of the main frame 30 and also to the lower ends of brackets 170 carried by the frame 150 in advance of its pivotal axis; to aid also in balancing the movement of the frame 150, and also initiate its return to normal or horizontal position, a second pair of similar coil springs 172 are attached to brackets 173 at the front side of the main frame and also to the upper ends of the brackets 170, as shown in Figures 6 and 7, the attachment of the outer ends of all said springs being by means of screws 174, to permit of convenient adjustment of the tension of the springs.

The movable frame 150 is latched in its horizontal or bundle-receiving position by means of a latch 175 pivoted at 176 to the inside portion of the main frame in position for engagement with the upper edge of one side of the frame 150 (see Figures 8 and 9); this latch has a tail portion 177 adapted to be received inside the frame 150 in the path of a cam 178 carried by a shaft 179 journaled in said frame 150, the forward end of said shaft carrying a bevel pinion 180 in mesh with the gear 162 on the shaft 136, to which gear said pinion bears the ratio of 1 to 2.

Figure 3:
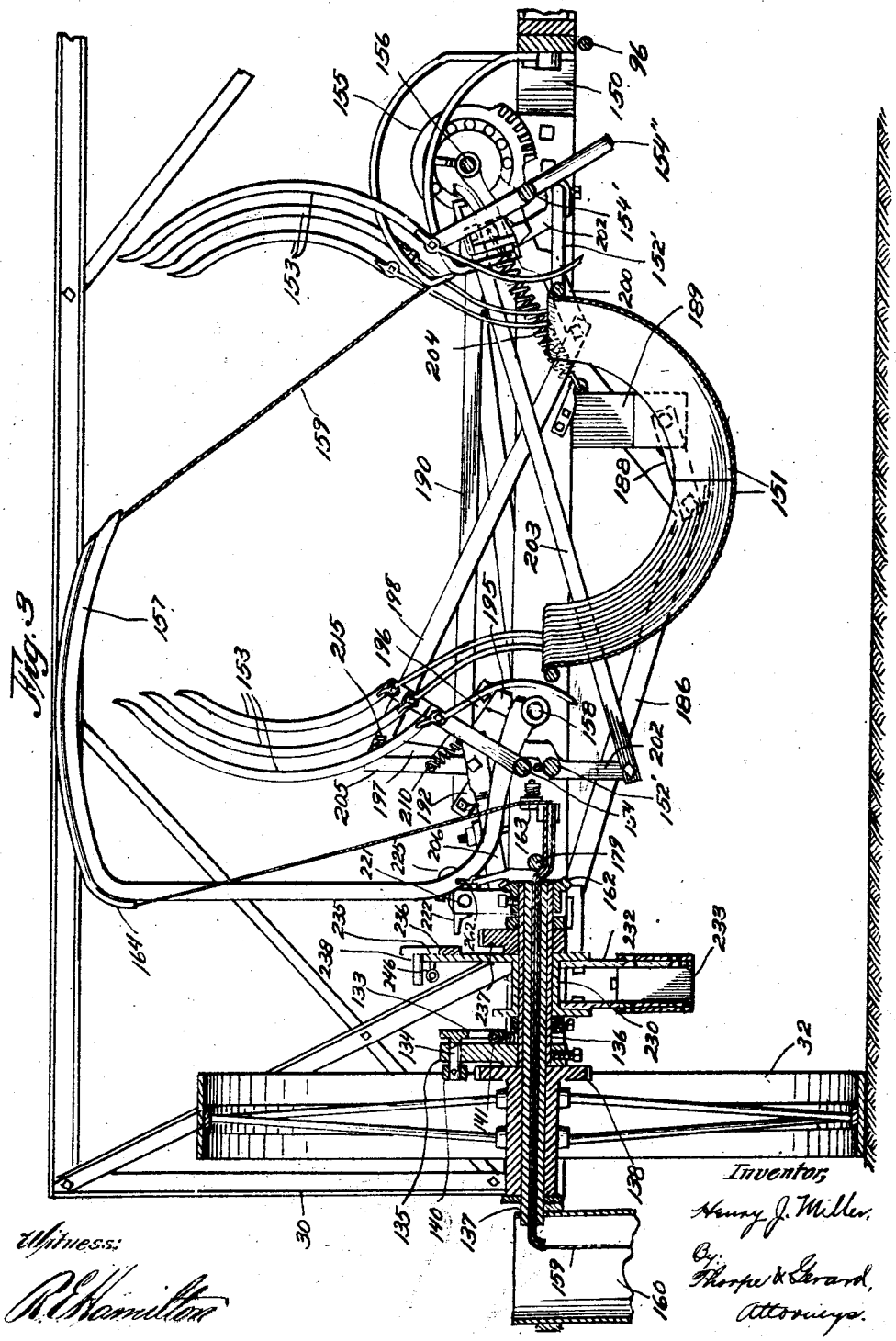
Figure 3 is a section on the line III—III of Figure 1, on an enlarged scale.

The rear end of the shaft 179 is provided with a crank arm 185 to which is pivotally connected one end of a triangular frame 186, the other end of which is pivoted to a crank arm 187 secured to the knotter shaft 156, the remaining corner of the frame 186 being pivoted to an idler crank 188 carried by a hanger 189 depending from the frame 30, as shown in Figures 8 and 9. The crank 187 is also connected by a link 190 to a crank 192 on the rear end of the needle shaft 158. The rear end of the shaft 158 also carries an arm 195 connected by links 196 to an intermediate point on a crank arm 197 carried by the shaft 154, the upper end of which crank 197 is in turn connected by a link 198 to a crank arm 200 on the rear end of the shaft 154'. The rear pivot arms 152' of the basket members 151 are each provided with a crank arm 202 projecting upwardly and downwardly, respectively, and connected by a link 203, the upwardly projecting crank 202 being connected by a coil spring 204 to a fixed point on the main frame 30 to assist in the automatic opening movement of the basket members 151. The other or downwardly projecting crank arm 202 is provided with an upwardly projecting extension 205 to which is pivoted the inner end of a catch 206 formed at its outer end with a tooth 207 adapted for latching engagement with a notch 208 formed in a forked bracket 209 projecting inwardly from the frame 150; a coil spring 210 is so connected to the inner end of the catch 206 as to tend to seat its tooth 207 in said notch 208. The function of this catch 206 is of course to latch the basket members in closed or bundle-receiving position, as shown in Figure 3. The catch 206 carries intermediate its ends a bolt 212 operating in the fork of the bracket 209, the lower end of said bolt carrying a nut 213 (see Figure 8) which engages the lower side of the bracket and thereby limits the pivotal movement of the catch, as well as guides its bodily movement in response to the movement of the arm 205, during the opening and closing operation of the basket members. The closing of the basket members is effected by engagement of an adjustable stop pin 215, carried by the end of the crank 197, with the upper end of the arm 205 on the return of the arms 153 to initial or spread relation, the catch 206 of course automatically engaging the notch 208 and latching said basket members in their closed position.

The unlatching and release of said basket members is also effected automatically by the action of a cam element 220 on a rock shaft 221 journaled in bearings on the movable frame 150, said shaft also carrying at its forward end a finger 222 (see Figure 4) actuated by a spring 223 to cause one end of said finger to rest against said frame, corresponding to the inoperative position of the cam 220. When the finger 222 is engaged and rocked, as hereinafter described, the cam is moved into lifting engagement with an adjustable screw 224 carried by a bracket 225 on the free end of the catch 206, thereby disengaging its tooth 207 from the notch 208.

Referring now to Figures 3, 4, 13 and 14, a sleeve 230 is mounted for free rotative movement on the shaft 136 adjacent the pawl-carrier block 135, to which sleeve is connected a pair of pendulum arms 232 supporting a pendulum bob in the form of a receptacle 233 adapted to receive a quantity of sand 234 or the like for imparting the required weight to the box. One of the arms 232 is projected upwardly above the axis of the shaft 136 to form an arm or extension 235 which carries a pivoted ratchet 236 adapted for engagement with the teeth of a curved rack 237, the curvature of which is about the same center as the shaft 136, and hence the pendulum structure just described (see Figure 6). The tail portion of the ratchet 236 carries a pin 238 adapted to engage the upper edge of the arm 235 and forms a stop limiting the movement of the ratchet into normal position, or out of engagement with the rack 237, as illustrated in Figure 6. The ratchet 236 is thrown into engagement with the rack 237 by means of a spring-actuated finger 240 pivotally mounted upon an inverted U-shaped bracket 242 secured to the movable frame 150 in the position illustrated in Figure 4, said finger (in the upward and forward swinging movement of the frame 150) engaging the pin 238 and rocking the ratchet 236 forward in the direction of the operative movement of said frame 150. The backward movement of the frame 150 likewise brings said finger 240 into engagement with the pin 238 for the purpose of releasing the ratchet from engagement with the rack, and permitting the pendulum to swing freely about its axis. If for any reason this release did not take place by the action of the finger 240, then the intermediate portion of the bracket 242 will engage the tail end of the ratchet 236 and by a positive movement of the same cause the release thereof from the rack 237.

The pendulum arm 235 also carries a pivoted catch or finger 245 actuated by a spring 246, the purpose of which finger is to engage and operate the finger 222 on the shaft 221, and thereby rock said shaft and its cam 220 to disengage the catch 206 and release the basket members.

In the movable frame 150 is also mounted a shaft 250 (see Figure 4), the rear end of which is provided with a hook or latch element 251 adapted, when the crank arm 185 has made a half turn to the position shown in Figure 9, to become locked in engagement with a pin 252 carried by said arm 185; this has the effect of temporarily locking the shaft 179 against rotation by means of the gears 162 and 180, so that the continued rotation of the gear 162 simply results in lifting the frame 150 about its axis into the position shown in Figures 10, 11 and 13, the latch 175 having meanwhile been operated to release said frame, as above explained. Intermediate its ends, the shaft 250 is provided with an arm 253 projecting laterally beyond the adjacent side of the frame 150 and overlying the side of the main frame 30, said arm normally maintaining the hook 251 in the path of the pin 252. In the swinging movement of the frame 150 to upright position, the arm 253 moves into engagement with a tripping finger 255 pivoted on the end of a fixed arm 256 supported by the main framework. This finger 255 is held by a spring 257 in the path of the free end of the arm 253, (see Figure 13), and yields to permit the passage of said arm in the forward swinging of the frame 150; but as said frame starts its return movement, the finger 255, by positive engagement with the arm 253, rocks it and its shaft 250 in a direction for disengaging the hook 251 from the pin 252. This has the effect of unlocking the shaft 179, so that the movement of the frame 150 to original horizontal position, with the gear 162 stationary, will effect rotation of the shaft 179 through the remainder of one complete revolution as required for one cycle of operation of the apparatus.

Pivotally suspended from brackets 260 at the front side of the main frame 30 is a butt-board 261 maintained in position for engagement with the butt ends of the bundles received in the basket members 151 and acting to hold the bundles evenly assembled in said basket members during the shock forming and tying operation. To the board 261 is adjustably connected the front ends of a pair of links 262, the rear ends of which are pivotally connected to the sides of the frame 150 in such a manner that the board 261 is swung slightly forward simultaneously with the operative or rising movement of the frame 150, for the purpose of affording ample clearance for the ends of the bundles in the up-ending of the shock; after which the lowering movement of the frame in returning to horizontal position likewise returns the board 261 to its original position. The brackets 260 are provided with a plurality of openings 264 for the pivots of the board 261, so that this, combined with the adjustment of the links 262, enables both the top and bottom of the board to be adjusted to suit the character or size of grain being harvested.

A summary of the operation of the machine will now be given. As the machine is drawn forward along with the binder 35, the bundles discharged from the binder are received by the lower end of the bundle conveyer (see Figure 2) and elevated thereby into overhanging relation to the fingers 100 of the bundle-counting mechanism. As the bundles are discharged from the conveyer one by one, they drop into the basket members 151 (now in closed position as represented in Figure 1), in which dropping movement they are intercepted by the fingers 100, depressing the latter and thereby imparting an intermittent oscillating movement to the pawl-carrying arm 110 (see Figures 14 to 16). When the number of bundles received by the basket members correspond to the number of teeth between the notches 115 on the ratchet wheel 112, the pawl 111 drops into one of said notches so that the next oscillation of the arm 110 will cause the pin 116 to engage and operate the pin 117 and thereby rock the shaft 113 in the manner above explained. This results in releasing the latch member 128 from the pin 132 with which it has been engaged, which permits the spring 141 to actuate the yoke 133 to throw the dog 140 into engagement with the ratchet wheel 138. This establishes the power connection between the wheel 32 and the main drive shaft 137 for operating the shocking mechanism proper, and each half turn of this shaft produces a complete revolution of the pinion shaft 179, corresponding to one complete operation of the shocking mechanism. The first quarter turn of the shaft 137 imparts a half revolution to the shaft 179, which moves the parts driven by the latter shaft from the positions illustrated in Figure 8 to the positions illustrated in Figure 9, for effecting the operation of the bundle-compressing arms 153 and the needle 157 and knot-tying means, all as above described. Simultaneously the cam 178 on the shaft 179 engages the tail of the latch 175 for operating the latter to release the frame 150 at the end of the first half turn of the shaft 179, by which time also the pin 252 carried by the crank arm 185 has become latched by means of the hook member 251 on the shaft 250, which operates to lock the shaft 179 against further rotation during the remaining quarter turn of the main shaft 137. During this remaining quarter turn of the shaft 137, therefore, the gears 162 and 180 remain locked against any relative movement, and the frame 150 and parts carried thereby are rocked upward into position for the discharge of the shock, as illustrated in Figures 10, 12 and 13.

As a matter of fact the shaft 137 is turned somewhat more than a quarter turn in the up-ending of the shock, bringing the frame 150 and its parts into the position shown by the broken lines in Figure 12, this being necessitated by the fact that in ascending a grade the shock cannot be set up in true vertical position without turning it through more than a right angle with relation to the main frame. It is for this reason that the latch 128 is provided with a slot 129 to allow it to yield and permit the frame 150 to pass through the right angle position with the pawl 140 maintained engaged with the ratchet wheel 130, and hence maintaining the drive connection between the wheel 32 and the shaft 137; but on reaching the maximum forward position represented by the broken lines in Figure 12, the end of the slot 127 engages the pin 126, so that the latch 128 no longer yields, but becomes a positive stop permitting no further movement of the yoke 133 and therefore trips the dog 140 from its engagement with the wheel 138. Since the spring 129 is slightly stronger than the spring 141, the dog 140 is maintained inoperative until the next tripping of the latch 128 by the counting mechanism which releases it from the pin 132. In the forward swinging of the frame 150, one of the beveled ends 146 of the arms 145 depresses the latch 147 and passes slightly beyond the same, so that on the release of the dog 140, the latch 147 limits the backward movement of the frame 150 to its right angle position relative to the frame 30.

Returning now to the forward movement of said frame 150, this movement is helped along by the action of the springs 166 which are initially under tension, and on passing into maximum forward position the springs 172 are in their turn placed under tension (as illustrated in Figure 12) to initiate the return movement of said frame 150. In the forward movement of the frame 150, the finger 240 engages the pin 238 and thereby rocks the ratchet 236 into engagement with the rack 237 for the purpose of locking the pendulum immediately prior to the engagement of the finger 222 on the shaft 221 with the catch 245 on the pendulum arm 235; that is, the ratchet 236 and rack 237 serves to set and brace the pendulum in vertical position preparatory to offering the reaction necessary to trip the catch 206 by operation of the finger 222, thereby releasing the basket members into open position for the discharge of the shock. This opening movement of the basket members is accomplished by the action of the spring 204, combined with the weight of the bundles forming the shock, which is thus deposited in true vertical position as determined by the position of the pendulum at the moment the shock is set in place. The forward swinging movement of the frame 150 also advances the butt-board 261, by means of the links 262, sufficiently to afford full clearance for the release of the bundles on opening of the basket members. It is also necessary to guard against any additional bundles being allowed to fall on the shocking mechanism during the up-ending and deposit of a shock, which is accomplished by stopping the action of the conveyer which feeds the bundles from the binder, and accordingly, as already indicated, the conveyer drive is disconnected by means of the clutch operating arm 96 being engaged and operated by one side of the frame 150 as it moves into upright position, said drive being reconnected automatically as the frame 150 returns to horizontal position.

In the return movement of the frame 150 back to horizontal position, the first action that takes place immediately after the tripping and release of the drive pawl or dog 140 is the unlocking of the pinion shaft 179 by the release of the pin 252 from the latch 251; this is effected by engagement of the catch 255 with the arm 253 of the rocker shaft 250 which carries said latch 251. The pinion shaft 179 and its gear 180 are now free to turn in the frame 150, while the gear 162 is restrained against any reverse rotation by the latch 147. The frame 150 receives its initial backward impulse from the springs 172, which combined with the weight of the basket frame carries the frame back to initial horizontal position. Obviously now the pinion shaft is given another half turn by its movement relative to the fixed gear 162, which movement it is apparent will be in the same direction as that which took place during the compressing and tying of the shock. This second half turn of the pinion shaft operates to retract the needle and open up the arms 159, and at the same time restores the basket members to original closed position as already explained in detail. This completes one cycle of the operation, ready for the formation of a new shock as the above steps of the operation are repeated. In case of a larger or smaller shock being required, it may be pointed out that this may be brought about by simply substituting for the ratchet wheel 112 another having the requisite number of teeth between the notches 115 to correspond to the number of bundles to be fed to the basket members for each shocking operation.

It will thus be apparent that I have devised a practical and efficient apparatus for carrying out the desired objects of the invention, and while I have illustrated what I now regard as the preferred form of construction for embodying the same, I desire to reserve the right to make all such changes

What I claim is:

1. An automatic shocking machine provided with supporting wheels and comprising, in combination, shock-forming mechanism mounted for rotative movement about the axis of said wheels, means for feeding bundles to said mechanism, means actuated by the movement of the machine for driving said mechanism and oscillating the same to discharge the shock, and means engaged and actuated by the bundles as fed to said mechanism for setting said driving means in operation for every predetermined number of bundles delivered by said feeding means.

2. An automatic shocking machine provided with supporting wheels and comprising a shock-forming mechanism movable about the axis of said wheels, means for driving said mechanism from one of said wheels, and means actuated by the feeding of bundles to said mechanism for setting said driving means in operation.

3. An automatic shocking machine provided with supporting wheels and comprising a shock-forming mechanism, and including shock-tying means, movable about the axis of said wheels, means for driving said mechanism from one of said wheels, and means actuated by the feeding of bundles to said mechanism for setting said driving means in operation.

4. An automatic shocking machine provided with supporting wheels and comprising a pair of basket members movable about the axis of said wheels, bundle-compressing arms also movable about said axis, and means for actuating said basket members and bundle-compressing arms from one of said wheels.

5. An automatic shocking machine provided with supporting wheels and comprising a pair of basket members movable about the axis of said wheels, shock-tying means also movable about said axis, and means for actuating said basket members and shock-tying means from one of said wheels.

6. An automatic shocking machine provided with supporting wheels and comprising a pair of basket members movable about the axis of said wheels, bundle-compressing arms and shock-tying means also movable about said axis, and means for actuating said basket members, arms and shock-tying means from one of said supporting wheels.

7. An automatic shocking machine provided with supporting wheels and comprising a shock-forming mechanism movable about the axis of said wheels, means for feeding bundles to said mechanism, means for driving said mechanism from one of said wheels, means actuated by the feeding of bundles to said mechanism for setting said driving means in operation, and means operated automatically for every predetermined number of bundles delivered by said feeding means to interrupt the operation of said feeding means.

8. An automatic shocking machine comprising, in combination, a shock-forming mechanism, means for effecting the release of the shock from said mechanism, and means controlled by the angle at which said machine is travelling with relation to the horizontal for timing the operation of said releasing means.

9. An automatic shocking machine provided with supporting wheels and comprising a shock-forming mechanism movable about the axis of said wheels, means for effecting the release of the shock from said mechanism, and means controlled by the angle at which said machine is travelling with relation to the horizontal for timing the operation of said releasing means.

10. An automatic shocking machine provided with supporting wheels and comprising a pair of basket members movable about the axis of said wheels, means for effecting the opening of said basket members to release the shock, and means controlled by the angle at which said machine is travelling with relation to the horizontal for timing the operation of said opening means.

11. An automatic shocking machine comprising, in combination, a shock-forming mechanism, means for effecting the release of the shock from said mechanism, a freely swinging pendulum provided with means for tripping said releasing means, and means operating automatically to lock said pendulum just prior to each action of said tripping means.

12. An automatic shocking machine provided with supporting wheels and comprising a shock-forming mechanism movable about the axis of said wheels, means for effecting the release of the shock from said mechanism, a pendulum mounted for free swinging movement about the axis of said wheels and provided with means for tripping said releasing means, and means operating automatically to lock said pendulum just prior to each action of said tripping means.

13. An automatic shocking machine provided with supporting wheels and comprising a pair of basket members movable about the axis of said wheels, means for effecting the opening of said basket members to release the shock, a pendulum mounted for free swinging movement about the axis of said wheels and provided with means for setting said basket-opening means in operation, and means operating automatically to lock said pendulum just prior to each action of said basket-opening means.

14. An automatic shocking machine comprising, in combination, a shock-forming mechanism, means for effecting the release of the shock from said mechanism, a freely swinging pendulum provided with means for tripping said releasing means, and means operating automatically to lock said pendulum just prior to each action of said tripping means, said locking means being operative to unlock said pendulum after each shock-releasing operation.

15. An automatic shocking machine provided with supporting wheels and comprising a frame movable about the axis of said supporting wheels, shock-forming and shock tying mechanism carried by said frame, a drive shaft connected axially for intermittent operation from one of said supporting wheels, a shaft carried by said frame and geared to said drive shaft for operating said shock-forming and shock-tying mechanism, and means for intermittently locking said shafts against relative movement for causing said drive shaft to lift said frame into shock-discharging position.

16. An automatic shocking machine provided with supporting wheels and comprising a frame movable about the axis of said supporting wheels, shock-forming mechanism carried by said frame, a drive shaft connected axially for intermittent operation from one of said supporting wheels, a shaft carried by said frame and geared to said drive shaft for operating said shock-forming mechanism, means for latching said frame in horizontal position, and means for automatically unlatching said frame and locking said shafts against relative movement for causing said drive shaft to lift said frame into shock-discharging position.

17. An automatic shocking machine provided with supporting wheels and comprising a frame movable about the axis of said supporting wheels, shock-forming mechanism carried by said frame, a drive shaft connected axially for intermittent operation from one of said supporting wheels, a shaft carried by said frame and geared to said drive shaft for operating said shock-forming mechanism, means for latching said frame in horizontal position, means for automatically unlatching said frame and locking said shafts against relative movement for causing said drive shaft to lift said frame into shock-discharging position, means for unlocking said shafts at the end of each lifting movement of said frame, and means for automatically returning said frame and relatching the same in initial position after each shock-discharging operation.

18. An automatic shocking machine provided with supporting wheels and comprising a frame movable about the axis of said supporting wheels, shock-forming mechanism carried by said frame, a drive shaft connected axially for intermittent operation from one of said supporting wheels, means actuated by said drive shaft for operating said shock-forming mechanism and also rocking said frame into shock-discharging position, and oppositely acting springs for initiating the swinging action of said frame in each direction of its movement.

19. An automatic shocking machine provided with supporting wheels and comprising a frame movable about the axis of said supporting wheels, shock-forming mechanism carried by said frame, a drive shaft connected axially for intermittent operation from one of said supporting wheels, a shaft carried by said frame and geared to said drive shaft for operating said shock-forming mechanism, means for intermittently locking said shafts against relative movement for causing said drive shaft to rock said frame into shock-discharging position, and means for unlocking said shafts and maintaining said drive shaft fixed as regards rotation after each lifting movement of the frame, whereby the reverse movement of said frame will operate to move said shock-forming mechanism to initial position.

20. An automatic shocking machine provided with supporting wheels and comprising a frame movable about the axis of said supporting wheels, shock-forming mechanism carried by said frame, a drive shaft connected axially for intermittent operation from one of said supporting wheels, a shaft carried by said frame and geared to said drive shaft for operating said shock-forming mechanism, means for intermittently locking said shafts against relative movement for causing said drive shaft to rock said frame into shock-discharging position, a freely swinging pendulum carried by said frame and provided with means for effecting the discharge of the shock when in substantially vertical position, and means for unlocking said shafts and maintaining the drive shaft fixed as regards rotation after each shock-discharging operation, whereby the reverse movement of said frame will operate to move said shock-forming mechanism to initial position.

21. An automatic shocking machine provided with supporting wheels and comprising a frame movable about the axis of said supporting wheels, shock-forming mechanism carried by said frame, a drive shaft connected axially for intermittent operation from one of said supporting wheels, a shaft carried by said frame and geared to said drive shaft for operating said shock-forming mechanism, means for intermittently locking said shafts against relative movement for causing said drive shaft to rock said frame into shock-discharging position, means for continuing said lifting movement of the frame until the latter has moved through more than a right angle from initial position, a freely swinging pendulum carried by said frame and operative to effect the discharge of the shock when the latter is in substantially vertical position, and means for unlocking said shafts and maintaining said drive shaft fixed as regards further rotation during the return movement of the frame, whereby said return movement will effect further rotation of said second shaft for moving said shock-forming mechanism to initial position.

In witness whereof I hereunto affix my signature.

HENRY J. MILLER.